Dec. 20, 1960 M. A. STICKELBER 2,965,047
DOUGH DEFLECTING STOP FOR LOAF MOLDERS
Filed April 7, 1958 2 Sheets-Sheet 2

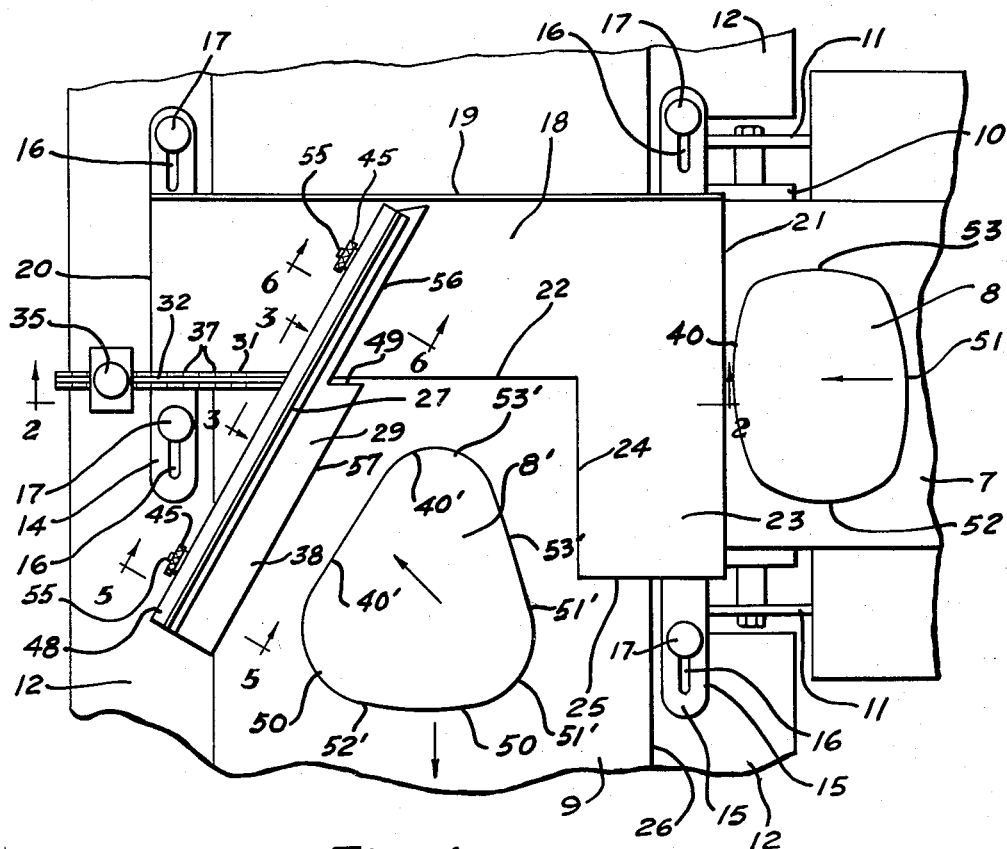

INVENTOR.
MERLIN A. STICKELBER
BY Alfred R. Fuchs
ATTORNEY

United States Patent Office 2,965,047
Patented Dec. 20, 1960

2,965,047

DOUGH DEFLECTING STOP FOR LOAF MOLDERS

Merlin A. Stickelber, Kansas City, Mo., assignor to Stickelber & Sons, Inc., a corporation of Missouri Filed Apr. 7, 1958, Ser. No. 726,809

8 Claims. (Cl. 107—12)

My invention relates to a mechanism for molding loaves of bread and similar bakery products, and more particularly to a molding machine in which the curling or coiling up of the dough piece is in a different direction than lengthwise of the sheeted dough piece. My invention is in an improvement over the oblique curling loaf molding mechanism disclosed in the patent to Walter B. Nichols on Oblique Curling Loaf Molders, No. 2,782,734, patented February 26, 1957.

My improved dough deflecting stop for loaf molders has the advantage that the passage of the sheeted dough piece, which is fed onto a conveyor belt, forming a portion of the curling or coiling means for the sheeted dough pieces, by discharging the sheeted dough pieces crosswise onto said belt from one side thereof, is halted so that it is more accurately located in position transversely of the conveyor belt than in any previously known means serving the purpose of locating the loaves transversely of the conveyor belt.

This accurate location of the dough pieces transversely of the conveyor belt is desirable in order that the sheeted dough pieces, after they have been curled up on themselves to form the molded loaf, will all be placed at the same location transversely of the conveyor belt and as a result all delivered to the pans in such a manner that no portion of the molded loaf overlaps the end of the pan, and the loaf located with its opposite ends at the same uniform spacing from the ends of the pan.

My improved dough deflecting stop member not only prevents the formation of miniature balls of dough and roughening of the edge of the dough piece that engages the stop member in the manner that was accomplished in the dough deflecting stop member disclosed in the above referred to Nichols patent, but prevents the thickening of the leading edge of the dough piece due to engagement with the dough stop. This is accomplished in my improved dough deflecting stop member by providing means for slowing down the travel of the sheeted dough piece by frictional engagement with means on the stop member, before it engages the limiting stop means provided thereon, so that the leading edge of the sheeted dough piece engages said limiting stop means gently instead of with considerable impact, as is the case of the leading edges of sheeted dough pieces engaging a vertical or other upstanding stop wall.

In order to accomplish the above referred to purposes, my improved dough stop has an upstanding wall that is provided with means at the bottom thereof for deflecting the leading edge of the dough piece upwardly so as to cause the dough piece to slide along said upstanding wall instead of engaging edgewise therewith, thus causing one of the flat faces of the sheeted dough piece to slide along on the dough engaging face of said upstanding wall. Furthermore, in order to provide for the definite location of the dough piece transversely of the conveyor belt with which my improved stop member cooperates, I provide means for limiting the upward travel of the sheeted dough piece on said upstanding wall.

An additional advantage of my invention is that when the sheeted dough piece is projected across the curling conveyor belt and engaged with the dough deflecting stop means, the sheeted dough piece will turn to a greater extent about its axis on the curling conveyor belt than by merely providing an obliquely extending upstanding stop wall, such as disclosed in the above referred to patent to Nichols, turning the leading edge more to the rear as the sheeted dough piece is carried forward by the curling conveyor belt. The dry surfaced edge portion of the sheeted dough piece, which is at the leading end of the dough piece as it is projected across the conveyor belt from the sheeting mechanism, will be positioned by such turning so as to be more uniformly distributed throughout the length of the molded loaf along the outer surface thereof, than has been previously possible. The turning is accomplished because of the oblique extent of the stop member and the retarding action that my improved dough deflecting member exerts on the sheeted dough piece as it is pulled off the deflecting stop member by the curling conveyor belt.

More specifically my improved dough deflecting stop member comprises an upstanding wall, that extends across the path of travel of the sheeted dough piece, as it is projected across the curling conveyor belt, and obliquely to the direction of travel of the curling conveyor belt, said wall having a transversely curved portion thereon extending longitudinally thereof along the lower part thereof and directed toward the side of the curling conveyor belt from which the sheeted dough pieces are fed into the same, which curved portion merges with the upstanding wall in an upwardly directed curve to thus deflect the leading edge of the sheeted dough piece that engages with said curved portion upwardly as it comes into engagement therewith to cause the dough piece to slide upwardly on its under face along said curved wall portion and the upstanding dough engaging face of the stop member. In order to halt this upward sliding movement of the dough piece on the stop member at a definite location a limiting stop is provided in the form of an angle bar that has a forwardly or horizontally extending flange that projects from the dough engaging surface of the upstanding wall with which the leading edge of the sheeted dough piece engages to halt the upward movement thereof. Means is provided for adjusting the position of said angle bar vertically with respect to said upstanding wall so as to accurately position the dough piece transversely with respect to the curling conveyor belt.

By adjustment of the stop member as a whole transversely of the conveyor belt and the adjustment of the limiting stop on the upstanding wall thereof the exact position of the sheeted dough piece for proper deposit in the pan, after it has been coiled or curled up on itself and otherwise acted on by the molding machine, is obtained. In addition to that, a loaf of better texture is obtained due to the turning of the dough piece to a greater angle without any thickening of the leading edge of the dough piece due to engagement of the upstanding dough stop wall therewith.

It is a particular purpose of my invention to provide my improved dough deflecting stop member in combination with a transfer plate that acts as a retarding member extending across a curling conveyor belt, the belt traveling outwardly from under a forward transverse marginal edge portion of said plate-like member so that when a sheeted dough piece is fed across the belt from one side edge thereof in such a manner that the sheeted dough piece bridges said forward edge with a part of the sheeted dough piece engaging the belt and a part thereof engaging the plate-like member, the action of the belt moving in a direction away from the plate-like member extends or lengthens the dough piece in the direction of travel of the curling conveyor belt.

More specifically my invention comprises an upstanding wall located in superposed relation to said belt and plate-like member and extending across said forward edge, which has means thereon adjacent the belt and plate-like member for deflecting dough pieces, that are fed crosswise of the belt parallel to the top surface of the belt upwardly along said upstanding wall, and to provide in combination with such an upstanding wall having such a deflecting means, means on said wall spaced upwardly from said deflecting means limiting travel of the dough piece up the wall. The sheeted dough piece is thus extended or lengthened and turned on its axis and also located exactly at the proper position transversely of the curling conveyor belt by the combined action of the transfer plate and stop member having the deflecting means and limiting means thereon.

Preferably the plate-like member is L-shaped in character, and said deflecting stop member has a concavely curved portion at the bottom thereof that extends upwardly from the plate and belt from a position closely adjacent thereto so that a sheeted dough piece traveling crosswise of the belt along the surface of the belt and plate-like member will be engaged by the concavely curved portion at the leading edge of said sheeted dough piece and deflected upwardly along the upstanding wall of the stop member.

Other objects and advantages of my invention will appear as the description of the drawings proceeds. I desire to have it understood, however, that I do not intend to limit myself to the particular details shown or described, except as defined in the claims.

In the drawings:

Fig. 1 is a plan view of a fragmentary portion of a bread molding machine to which my improved dough deflecting stop is applied.

Fig. 2 is a section taken on the line 2—2 of Fig. 1, partly broken away.

Figure 3:
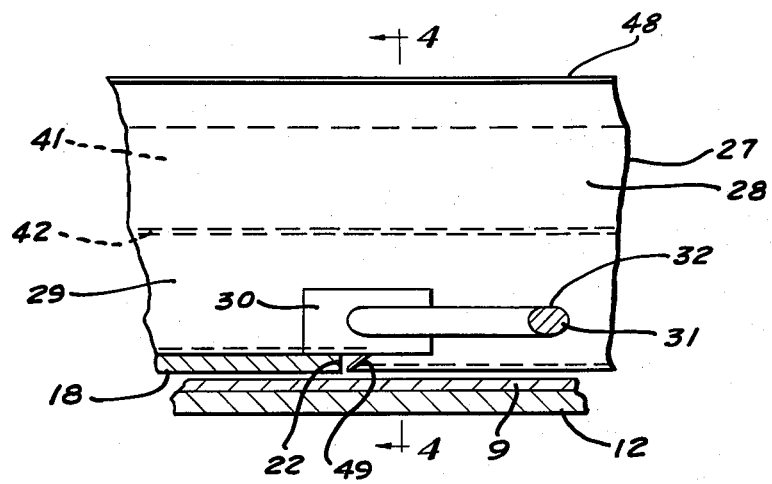
Fig. 3 is a fragmentary section taken on the line 3—3 of Fig. 1 on an enlarged scale.

Referring in detail to the drawings, my invention is shown as being applied to a bread molding machine that has a sheeting mechanism of any desired character and which discharges pieces of sheeted dough onto a conveyor belt 7, which operates in the direction of the arrow appearing thereon. A sheeted dough piece 8 is shown as being on the conveyor belt 7 and the sheeting of the dough piece by the sheeting mechanism is in the direction of travel of the conveyor belt 7. Said bread molding machine is also provided with a curling conveyor belt 9, which operates in the direction of the arrow appearing thereon, the conveyor belts 7 and 9 operating over suitable rollers mounted in the frame of the machine, the conveyor belt 7 being shown as operating over the roller 10, which is mounted for rotation in the bracket members 11 provided on the frame of the molding machine.

Said molding machine has a table-like member 12 over which the belt 9 operates, said table-like member extending beyond the side edges of the belt 9, as will be obvious from Figs. 1 and 2, and having a downturned side wall 13 extending therefrom. Suitable loaf curling means cooperates with the belt 9 in a well known manner at a point beyond that shown in Fig. 1 of the drawings. Mounted on the table member 12 and extending lengthwise thereof are the bars 14 and 15. Said bars rest on the top surface of the table-like member 12 and have longitudinally extending slots 16 therein through which headed fastening elements 17 extend, said fastening elements 17 being engaged with the table-like member 12 in a well known manner, and said heads 17 being adapted to clamp the bars 14 and 15 in adjusted position lengthwise of the table top 12 as the fastening elements 17 are tightened down on the machine.

Mounted on said bars 14 and 15 in fixed position relative thereto is a plate-like member 18. Said plate-like member has an upstanding flange 19 at the rear transverse edge thereof, the edge of the plate-like member that is on the upstream side of the belt 9 being referred to herein as the rear edge thereof. Said plate-like member has parallel side edges 20 and 21 and a transverse forward edge 22 from under which the belt 9 travels outwardly. The main body portion of the plate-like member 18 extends transversely of the belt 9, but said plate-like member also has a forwardly extending leg portion 23. Thus the plate is substantially L-shaped in plan as viewed in Fig. 1. Said forwardly extending leg portion 23 has an inner edge 24 that extends in the direction of travel of the belt 9 and is parallel to the edges 20 and 21 and has a forward transverse edge portion 25.

It will be noted that the plate-like member 18 overlaps the side edge 26 of the belt 9 and the discharge end of the belt 7. The belt 7 travels at a high rate of speed to project the sheeted dough pieces 8 across the plate-like member 18 and the belt 9 parallel to the top faces thereof. The upstanding flange 19 along the rear edge of the plate-like member is provided to prevent catching of the belt 9 on the edge of the plate. It will be obvious that the plate-like member 18 can be adjusted lengthwise of the belt 9 and thus transversely of the belt 7 so as to get the plate 18 in proper position relative to the sheeted dough piece 8 that is projected across the same. The proper position for the plate 18 is that at which the desired extension or stretching of the sheeted dough piece is obtained, the amount of extension or stretch of the dough piece by the combined action of the belt 9 and the plate-like member 18 being determined by the relative proportion of the sheeted dough piece that is in engagement with the plate 18 and the belt 9 when it has been projected across the plate into such a position that it bridges the forward edge 22 of said plate 18.

The plate-like member 18 is supported on the table 12 by means of the bars 14 and 15 in such a manner that the belt 9 lightly slidably engages the under face thereof, the spacing of the belt 9 and plate-like member being slightly exaggerated in the drawings to indicate that the plate-like member does not rest on the belt. The plate-like member 18 is positioned slightly below the top face of the upper run of the belt 7, which is in a plane slightly higher than that of the belt 9. As will be obvious from Fig. 2, the edge 21 of the plate-like member is slightly to the left and below the top of the curved surface of the belt 7 where it passes around the roller 10. Accordingly, when the belt 7 projects the dough piece over the edge 21 it will readily clear said edge and slide along on the plate 18, passing over the side edge 26 of the belt 9 and to suitable stop means cooperating with the plate 18 in a manner to be described below.

Figure 4:
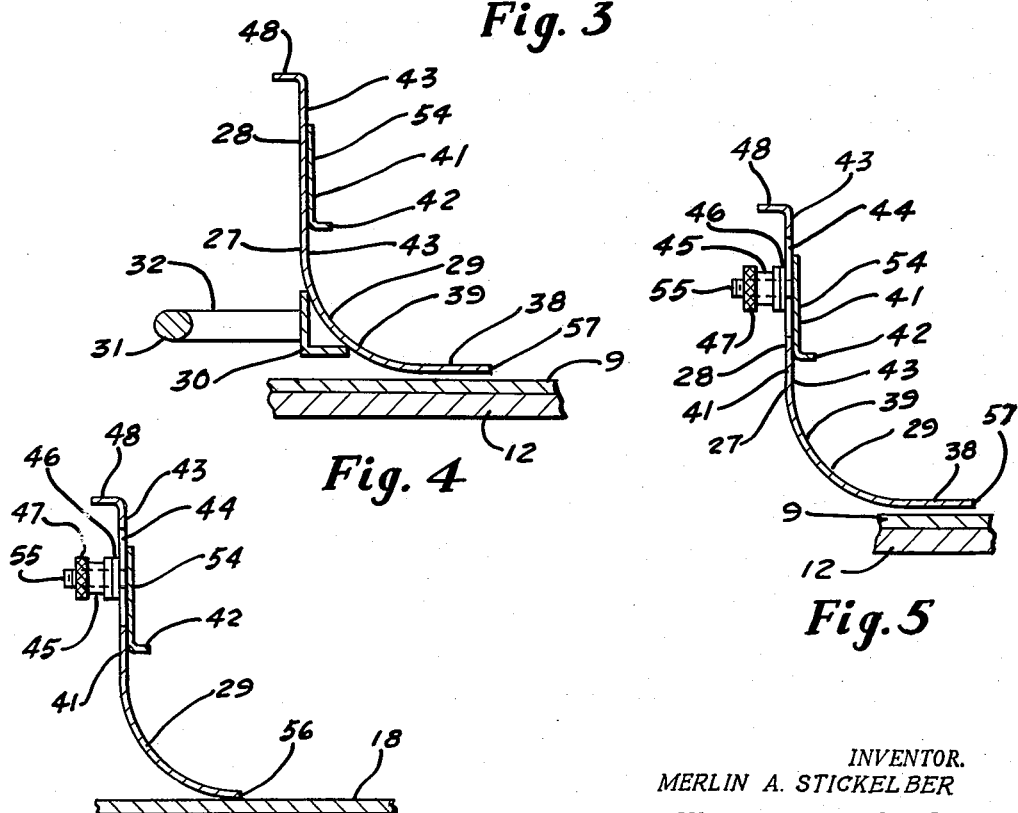
Fig. 4 is a section taken on the line 4—4 of Fig. 3.
Figure 5:
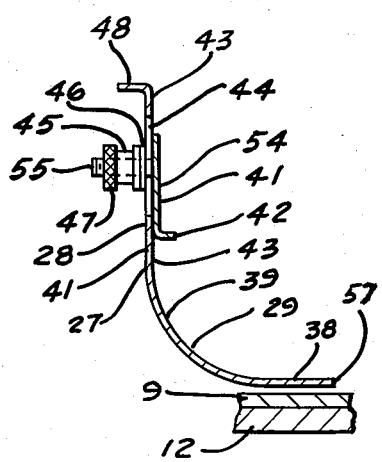
Fig. 5 is a section taken on the line 5—5 of Fig. 1, on an enlarged scale.

The deflecting stop member that cooperates with the plate-like member 18 to transfer the dough piece from the belt 7 to the belt 9 to a proper position for coiling or curling up on itself to form the molded loaf, comprises a body portion 27, which has an upper upstanding or vertical wall portion 28 and a lower curved wall portion 29. Said body portion has an angle member 30 secured thereto, as by means of welding, to which a bar or rod-like member 31 is welded in fixed position. Said bar is substantially circular in cross section, but has a flat top face 32, as will be obvious from Figs. 1, 3 and 4. A post 33 is provided on the table 12 that has an opening 36 therethrough, through which the rod-like member 31 extends, and a clamping screw 34 is screw-threadedly engaged with said post having a knurled head 35 thereon, by means of which it can be tightened down on the flat face 32 of the bar 31 to hold it in adjusted position and against any tendency to turn in the opening 36 in said post 33. Said bar 31 may be provided with any suitable indicia 37 thereon, by means of which the position of the body portion 28 transversely of the plate-like member 18 and conveyor belt 9 can be determined.

Figure 6:
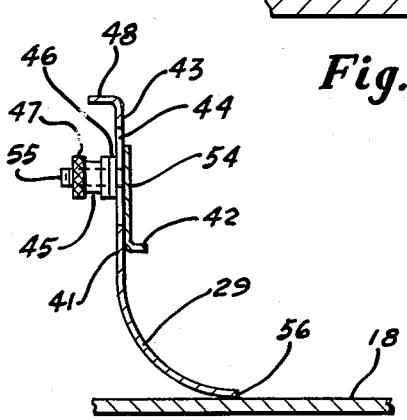
Fig. 6 is a view similar to Fig. 5, taken on the line 6—6 of Fig. 1.

It will be noted that the body portion 27 extends at an oblique angle to the direction of travel of the conveyor belt 9, the angle that is desirable for the position of the body portion 27 being substantially 30°. The curved lower portion 29 of said body portion 28 curves through substantially a quadrant, as will be obvious from Fig. 4, and the portion thereof over the belt has a horizontal portion 38 extending from the curved portion 29 toward the side edge 26 of the belt, which is that side edge of the belt on which the sheeted dough piece feeding belt 7 is located. Said curved portion 29 curves gradually upwardly from the straight horizontal lip 38 to the straight or vertical portion 28 of said upstanding stop member to thus smoothly merge with said vertical portion 28. The curvature of the portion 29 is about an axis parallel to the length of the body portion 27 and extends the entire length of the upstanding stop member 27 and is tangent to the top surface of the plate 18 (see Fig. 6), thus presenting a concave dough engaging surface 39 to the sheeted dough pieces as they slide across the top surface of the plate 18 and onto the curved portion 29 of said stop member.

The forward or leading edge 40 of the dough piece 8 will travel up the vertical wall portion 28 of the body portion 27 of said stop member after it leaves the curved portion 29, and in order to limit the upward movement along the wall portion 28 a limiting stop 41 is provided on said vertical wall 28, said stop 41 being angular in cross section, having a flange 42 that projects perpendicularly to the dough engaging face 43 of the vertical wall 28. The leg 54 of the angular in cross section stop member 41 is relatively long as compared with the leg 42 thereof to thus provide a wide bearing surface for the stop bar on the vertical wall portion 28 of the body portion 27. Said vertical wall portion is provided with a plurality of vertically extending slots 44 through which the threaded studs 55 on the limiting stop bar 41 extend, said studs 55 being preferably fixed to the member 41 by welding or in a similar manner, and having a clamping nut 45 screw-threadedly engaging therewith, said clamping nut engaging the washer 46 mounted on the stud 55, between the vertically extending portion 28 of the member 27 and the clamping nut 45. Said clamping nut is provided with a knurled portion 47 so that the same can be more readily tightened up without the use of tools. Preferably, a stiffening flange 48 is provided at the upper marginal edge of the body portion 28.

In order that the lower curved portion 29 of the upstanding stop member can be mounted substantially tangent to the belt 9, the spacing of the portion 38 from said belt being slightly exaggerated in the drawings, the straight portion 38 and the extremity of the curved portion 29 adjacent thereto, is cut away to provide an offset 49 therein, which is located at the forward marginal edge 22 of the plate-like member 18, fitting around the same in such a manner that the longitudinal edge 56 of the curved portion 29, which is offset from the longitudinal edge portion 57 of the portion 38, is substantially tangent to the top surface of the plate-like member 18, the curved portion 29 adjacent said edge 56 resting on the plate-like member 18. The curved portion 29 thus presents a concave face 39 to the sheeted dough piece both over the plate-like member 18 and the belt 9 and provides a deflecting means for directing the forward or leading edge 40 of the sheeted dough piece upwardly along the curved surface 39 and along the dough engaging face 43 of the vertical portion 28 of the dough deflecting stop member 27 until the flange 42 on the member 41 is engaged thereby. The position of the member 41 can be adjusted so that the edge 40 of the sheeted dough piece will only lightly engage with said flange 42.

Due to the oblique angular relationship of the entire body portion 27 to the direction of travel of the belt 9 and the direction in which the sheeted dough piece was projected across the plate 18 and belt 9 by the conveyor belt 7, the sheeted dough piece will be turned so that the direction in which it was sheeted will be at an angle of substantially 30° to the direction which it had prior to engagement with said member 27. Also the dough piece will be further turned and changed in shape somewhat, due to the fact that it is turned at an oblique angle to the direction of travel of the belt 9 and due to the action of the belt 9 pulling thereon, while the plate 18 and portions 29 and 38 of the stop member tend to hold it back or retard it. The result of this action of the plate-like member 18 and the belt 9 in cooperation with the obliquely extending stop member 27 and its curved portion 29 and horizontal portion 38, which exert a certain amount of retarding action on the dough piece at 50 where the forward and rear edges 40 and 51 join with the side edge 52 and a rounding of the side edge 53 so as to form rounding end portions 52' and 53' on the dough piece 8', shown in Fig. 1 as being entirely on the conveyor belt 9 after having been acted on by the plate-like member 18, the belt 9 and the stop member 27. The direction in which the dough piece was sheeted is indicated on the dough piece 8' shown on the conveyor belt 9 by means of the arrow appearing thereon. The turning and change in shape of the dough piece 8 places the forward dry edge 40 thereof to the rear of the dough piece as it is carried along by the belt 9, said edge portion being indicated by 40' in Fig. 9, while the end edge 51 is indicated by the numeral 51' in Fig. 1.

What I claim is:

1. In a molding machine, a conveyor belt, means for discharging sheeted dough pieces onto said belt crosswise thereof from one side thereof in a path closely adjacent the top surface of said belt and parallel thereto, and a stop member extending over said belt having an upstanding wall extending across and projecting upwardly from the discharge path of said dough pieces, said stop member having means thereon extending across said discharge path for deflecting said dough pieces upwardly along said wall and horizontally projecting means on said wall spaced upwardly from said deflecting means and extending longitudinally of said wall to limit upward travel of said dough pieces on said wall.

2. In a molding machine, a conveyor belt, feeding means for discharging sheeted dough pieces onto said belt crosswise thereof from one side thereof in a path closely adjacent the top surface of said belt and parallel thereto, and a stop member extending over said belt having an upstanding wall extending obliquely across and projecting upwardly from the discharge path of said dough pieces, said stop member having deflecting means thereon at the bottom thereof presenting an upwardly curving wall portion intersecting the discharge path of said feeding means and longitudinally extending means on said wall below the top thereof spaced upwardly from said deflecting means for limiting upward travel of said dough pieces on said wall.

3. In a molding machine, a conveyor belt, feeding means for discharging sheeted dough pieces onto said belt crosswise thereof from one side thereof in a path closely adjacent the top surface of said belt and parallel thereto, a transfer plate closely adjacent said belt having a forward edge extending crosswise of said belt, and a stop member extending over said belt and across said edge having an upstanding wall extending across the discharge path of said dough pieces, said stop member having means at the bottom thereof adjacent said plate and belt presenting an upwardly curving wall portion intersecting the discharge path of said feeding means for deflecting said dough pieces upwardly along said wall and having a horizontal bottom wall portion adjacent said belt extending from the bottom of said curved wall portion toward said one side of said belt.

4. In a molding machine, a conveyor belt, feeding means for discharging sheeted dough pieces onto said belt crosswise thereof from one side thereof in a path closely adjacent the top surface of said belt and parallel thereto, a transfer plate closely adjacent said belt having a forward edge extending crosswise of said belt, and a stop member extending over said belt and across said edge having an upstanding wall extending across the discharge path of said dough pieces, said stop member having means at the bottom thereof adjacent said plate and belt presenting an upwardly curving wall portion intersecting the discharge path of said feeding means for deflecting said dough pieces upwardly along said wall and having a horizontal bottom wall portion adjacent said belt extending from the bottom of said curved wall portion toward said one side of said belt, said upstanding wall having a horizontally extending stop member thereon upwardly spaced from said deflecting means and extending longitudinally of said wall.

5. In a molding machine, a conveyor belt, a plate-like member overlying said belt and extending in a plane substantially parallel to the top surface of said belt, having a forward transverse marginal edge portion closely adjacent said belt, said belt traveling outwardly from under said plate-like member at said forward edge portion, means for feeding a sheeted dough piece across said belt and plate-like member in a path transversely to the direction of travel of said belt from beyond one side edge of said belt in bridging relation to said forward edge portion, and a stop member having an upstanding wall located in superposed relation to said belt and plate-like member and having means thereon adjacent said belt and plate-like member for deflecting said dough pieces upwardly along said wall, said deflecting means having a horizontal lip projecting laterally therefrom at the bottom thereof cooperating with said plate-like member to position said dough pieces on said conveyor belt.

6. In a molding machine, a conveyor belt, a plate-like member overlying said belt having a forward transverse marginal edge portion closely adjacent said belt, said belt traveling outwardly from under said plate-like member at said forward edge portion, means for feeding a sheeted dough piece across said belt and plate-like member in a path closely adjacent the surface of said belt from beyond one side edge of said belt in bridging relation to said forward edge portion, a wall located in superposed relation to said belt and plate-like member having a transversely curved lower portion extending lengthwise thereof adjacent said belt and plate-like member toward said side of said edge of said belt and intersecting said path, said curved portion having a horizontal bottom extension thereon overlying said belt and a horizontally extending stop flange extending lengthwise of said wall in upwardly spaced relation to said curved portion on the dough engaging face of said wall.

7. A sheeted dough stop member for molding machines comprising a body portion having an upstanding planar wall portion, a transversely curved wall portion extending downwardly from the bottom of said planar portion to project laterally therefrom and a horizontal bottom flange extending laterally from the bottom of said curved wall portion, said horizontal bottom flange extending perpendicularly to said upstanding wall portion, and a stop bar extending longitudinally of said planar wall portion, said stop bar having a stop flange thereon positioned below the top of and extending perpendicularly to said planar wall portion, said stop flange being of less lateral projection than said curved wall portion and projecting laterally from said planar wall portion on the same side thereof as said curved wall portion to dispose the major portion of said curved wall portion laterally beyond said stop flange.

8. A sheeted dough stop member for molding machines comprising a body portion having an upstanding planar wall portion, a transversely curved wall portion extending downwardly from the bottom of said planar portion to project laterally therefrom and a horizontal bottom flange extending laterally from the bottom of said curved wall portion, said horizontal bottom flange extending perpendicularly to said upstanding wall portion, and a stop bar extending longitudinally of said planar wall portion, said stop bar having a stop flange thereon positioned below the top of and extending perpendicularly to said planar wall portion, said stop flange being of less lateral projection than said curved wall portion and projecting laterally from said planar wall portion on the same side thereof as said curved wall portion to dispose the major portion of said curved wall portion laterally beyond said stop flange, said stop bar being mounted for vertical adjustment on said planar wall to adjust the spacing thereof from said curved wall portion.

References Cited in the file of this patent

UNITED STATES PATENTS

| 1,669,220 | Thropp et al. | May 8, 1928 |
| 2,655,876 | Stickelber | Oct. 20, 1953 |
| 2,707,924 | Hansen | May 10, 1955 |
| 2,714,358 | Boston | Aug. 2, 1955 |
| 2,782,734 | Nichols | Feb. 26, 1957 |
| 2,804,026 | Boston | Aug. 27, 1957 |

FOREIGN PATENTS

| 331,244 | Great Britain | June 27, 1930 |